(12) United States Patent
Hawkins et al.

(10) Patent No.: US 8,272,694 B2
(45) Date of Patent: Sep. 25, 2012

(54) ARTICULATING PASSENGER SEAT

(75) Inventors: Nathaniel Hawkins, Greensboro, NC (US); Dennis Hedrick, Colfax, NC (US); Jeremy Green, Clemmons, NC (US)

(73) Assignee: B/E Aerospace, Inc., Wellington, FL (US)

( * ) Notice: Subject to any disclaimer, the term of this patent is extended or adjusted under 35 U.S.C. 154(b) by 266 days.

(21) Appl. No.: 12/745,039

(22) PCT Filed: Jun. 12, 2009

(86) PCT No.: PCT/US2009/047165
§ 371 (c)(1),
(2), (4) Date: May 27, 2010

(87) PCT Pub. No.: WO2010/005678
PCT Pub. Date: Jan. 14, 2010

(65) Prior Publication Data
US 2010/0308167 A1    Dec. 9, 2010

Related U.S. Application Data

(60) Provisional application No. 61/078,933, filed on Jul. 8, 2008.

(51) Int. Cl.
*B60N 2/12* (2006.01)
*B60N 2/22* (2006.01)
*B60N 2/02* (2006.01)
*B60N 2/04* (2006.01)
*B60N 2/06* (2006.01)

(52) U.S. Cl. ........ 297/341; 297/317; 297/318; 297/322; 297/342

(58) Field of Classification Search ................. 297/317, 297/318, 322, 341, 342
See application file for complete search history.

(56) References Cited

U.S. PATENT DOCUMENTS

| 2,290,556 | A | * | 7/1942 | Hard | 297/342 |
| 2,746,520 | A | * | 5/1956 | Ducrot | 297/322 |
| 3,224,808 | A | * | 12/1965 | Spielman | 297/341 |
| 3,329,463 | A | * | 7/1967 | Zimmermann | 297/342 X |
| 3,337,266 | A | * | 8/1967 | Burns | 297/317 |

(Continued)

FOREIGN PATENT DOCUMENTS

JP    2007-050121 A    3/2007

OTHER PUBLICATIONS

International Search Report dated Mar. 9, 2010 from Korean Patent Office for International Patent Application No. PCT/US2009/047165.

*Primary Examiner* — Rodney B White
(74) *Attorney, Agent, or Firm* — Shumaker, Loop & Kendrick, LLP

(57) ABSTRACT

A passenger seat, having a seat back, and a seat bottom, including a seat pan, supported by a frame mounted on laterally spaced-apart legs for being mounted to the deck of the aircraft by track fittings. A seat back frame assembly and a seat bottom assembly are joined for articulating movement such that when the seat back is reclined, the seat pan is shifted forward and the forward end of the seat pan and thus the seat bottom is raised in order to maintain an appropriate passenger seating angle.

11 Claims, 10 Drawing Sheets

U.S. PATENT DOCUMENTS

| | | | |
|---|---|---|---|
| 3,880,462 A | 4/1975 | Mednick | |
| 3,947,069 A * | 3/1976 | Lusch | 297/317 |
| 4,226,473 A | 10/1980 | Johnson | |
| 4,362,336 A * | 12/1982 | Zapf et al. | 297/317 |
| 4,364,603 A * | 12/1982 | Johnson | 297/317 X |
| 4,452,486 A * | 6/1984 | Zapf et al. | 297/317 X |
| 4,504,090 A * | 3/1985 | Goldman | 297/342 |
| 5,133,587 A * | 7/1992 | Hadden, Jr. | 297/318 X |
| 5,868,467 A * | 2/1999 | Moll | 297/317 |
| 6,641,214 B2 * | 11/2003 | Veneruso | 297/322 |
| 6,742,840 B2 * | 6/2004 | Bentley | 297/317 X |
| 6,899,397 B2 * | 5/2005 | Johnson | 297/452.33 |
| 7,063,386 B2 | 6/2006 | Dowty et al. | |
| 7,108,326 B2 * | 9/2006 | Schurg | 297/317 X |
| 7,229,118 B2 * | 6/2007 | Saberan et al. | 297/336 X |
| 7,252,340 B2 * | 8/2007 | Johnson | 297/452.29 |
| 7,458,643 B2 * | 12/2008 | Johnson | 297/452.33 |
| 7,472,957 B2 * | 1/2009 | Ferry et al. | 297/343 |
| 7,523,888 B2 * | 4/2009 | Ferry et al. | 244/118.6 |
| 7,637,571 B2 * | 12/2009 | Okano et al. | 297/341 X |
| 7,699,400 B2 * | 4/2010 | Speh et al. | 297/342 X |
| 7,762,630 B2 * | 7/2010 | Ott et al. | 297/341 |
| 7,874,618 B2 * | 1/2011 | Kohl et al. | 297/341 X |
| 7,926,873 B2 * | 4/2011 | Rombouts | 297/217.3 |
| 7,997,654 B2 * | 8/2011 | Ferry et al. | 297/342 |
| 8,038,217 B2 * | 10/2011 | Yamagishi et al. | 297/341 |
| 2002/0163235 A1 * | 11/2002 | Marais | 297/317 |
| 2008/0169694 A1 * | 7/2008 | Speh et al. | 297/300.1 |
| 2012/0062008 A1 * | 3/2012 | Rivera | 297/341 |

* cited by examiner

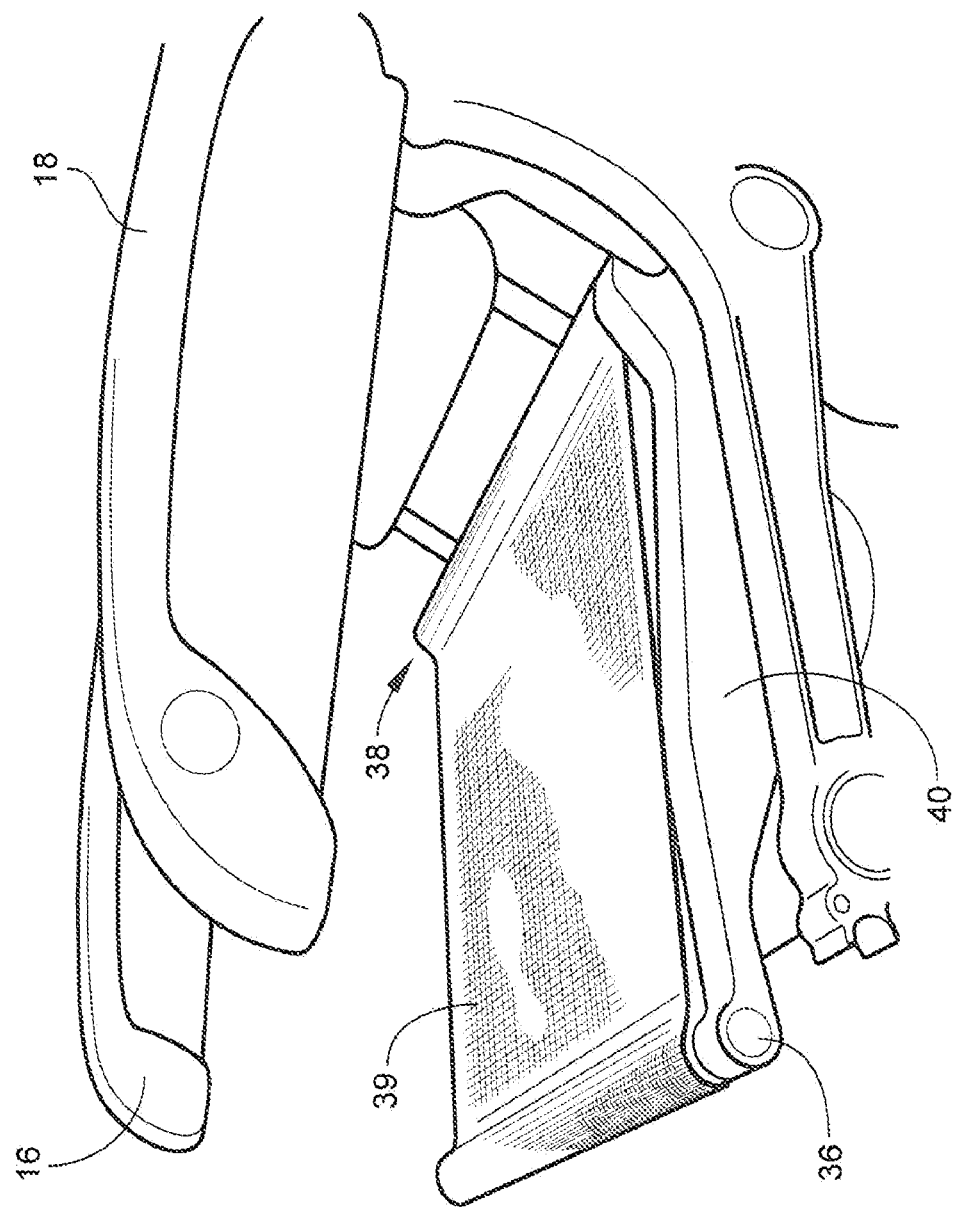

ARTICULATING PASSENGER SEAT

CROSS-REFERENCE TO RELATED APPLICATION

This application claims the benefit of U.S. Provisional Application No. 61/078,933, filed Jul. 8, 2008.

TECHNICAL FIELD AND BACKGROUND OF THE INVENTION

This invention relates to a passenger seat having a seat bottom and seat back that articulate together to provide a more comfortable seating experience for a seated passenger. While the particular embodiment shown and described in this application relates to an aircraft coach class passenger seat, the features of the seat have application in other seating environments.

Aircraft seating is typically divided into various classes, for example first class, business class, and coach or tourist class. For each class of seating, an individual passenger is allotted a preselected amount of space (both area and volume). First-class seats provide the most individual space, and also may include features to improve comfort, such as fully reclining sleeper functions. In contrast, the tourist/coach class is provided with a relatively small amount of space in order to provide the most efficient transportation and lowest cost. However, this space limitation can produce passenger discomfort, particularly in seats having a reclining seat back but without a compensating adjustment of the seat bottom. In these situations, the passenger has a tendency to slide forwardly on the seat bottom, causing discomfort and restlessness, particularly on long flights.

Therefore, there exists a need for a coach class seat that has an efficient and easy-to-operate mechanism that permits simultaneous rearward movement of a seat back assembly with a compensating upward movement of the forward end of the seat bottom so that the passenger maintains a similar angle between the upper and lower body.

SUMMARY OF THE INVENTION

Therefore, it is an object of the invention to provide a passenger seat that has an articulating seat back and seat bottom.

It is another object of the invention to provide an aircraft passenger seat that includes a compensating upward movement of the forward end of the seat bottom so that the passenger maintains a similar angle between the upper and lower body.

It is another object of the invention to provide an aircraft passenger seat according to several embodiments which permits simultaneous articulation of the seat back and seat bottom.

In a preferred embodiment of a passenger seat having a simultaneous rearward movement of a seat back assembly with a compensating forward and upward movement of a forward end of a seat bottom assembly so that the passenger maintains a similar angle between the upper and lower body in both an upright and reclined seat back position, the passenger seat includes: a seat back assembly and a seat bottom assembly supported by a frame mounted on laterally spaced-apart legs for being mounted to a deck of an aircraft, the frame including fore and aft, laterally-extending beam tubes; first and second laterally-spaced seat pan rails carried by the seat bottom assembly for supporting a seat pan; and a pivot linkage. The pivot linkage includes: a recline arm pivotally-connected proximate a first end to the seat back assembly and pivotally-connected proximate a second end to a first end of a crank link; the crank link pivotally connected at a second end remote from the recline arm to the seat pan for allowing the recline arm to drive the crank and transfer motion of the seat back between upright and reclined positions through the crank link to cause corresponding rearward and forward motions of the seat bottom assembly; the seat pan rails defining respective downwardly-facing, shaped contact surfaces proximate a forward end thereof for riding on an upwardly-facing surface of the forward beam tube, the shaped contact surface adapted to lift the seat pan during forward movement of the seat pan, and lower the seat pan during rearward movement of the seat pan, thereby simultaneously raising and shifting forward the seat pan as the seat back assembly reclines and simultaneously lowering and shifting rearward the seat pan as the seat back assembly moves from the reclined position to the upright position.

In at least one embodiment, the pivot connection between the recline arm and the crank link is a free connection.

In at least one embodiment, the forward beam tube includes a roller bearing positioned thereon against which the downwardly-facing surfaces of the seat pan rails ride.

In at least one embodiment, the forward beam tube includes a plastic bearing surface and the downwardly-facing surfaces of the seat pan rails comprise metal.

In at least one embodiment, the forward beam tube includes a metal bearing surface and the downwardly-facing surfaces of the seat pan rails comprise low coefficient of friction plastic.

In at least one embodiment, the seat pan rails include roller bearing assemblies for engaging and riding on the fore and aft beam tubes, and further wherein the reclining movement of the seat back assembly causes the roller bearing assemblies to move forwardly and to roll up over the beam tubes, raising and shifting the forward end of the seat bottom in the forward direction.

In at least one embodiment, fore and aft diaphragm tubes carried by the seat pan rails are included for supporting a fabric diaphragm.

In another preferred embodiment of a passenger seat having a simultaneous rearward movement of a seat back assembly with a compensating forward and upward movement of a forward end of a seat bottom assembly so that the passenger maintains a similar angle between the upper and lower body in both an upright and reclined seat back position, the passenger seat includes: a seat back assembly and a seat bottom assembly supported by a frame mounted on laterally spaced-apart legs for being mounted to a deck of an aircraft, the frame including fore and aft, laterally-extending beam tubes; a seat occupant operable seat back recline assembly for permitting the seat occupant to selectively move the seat back assembly between upright and reclined positions; first and second laterally-spaced seat pan rails carried by the seat bottom assembly for supporting a seat pan and a seat bottom cushion supporting seat diaphragm; and a pivot linkage. The pivot linkage includes: a recline arm pivotally-connected proximate a first end to the seat back assembly and pivotally-connected proximate a second end to a first end of a crank link; the crank link pivotally connected at a second end remote from the recline arm to the seat pan for allowing the recline arm to drive the crank and transfer motion of the seat back between upright and reclined positions through the crank link to cause corresponding rearward and forward motions of the seat bottom assembly. The seat pan rails define respective downwardly-facing, shaped contact surfaces proximate a forward end thereof for riding on an upwardly-facing surface of the forward beam tube, the shaped contact surface adapted to lift the seat pan during forward movement of the seat pan, and lower the seat pan during rearward movement of the seat pan, thereby simultaneously raising and shifting forward the seat pan as the seat back assembly reclines and simultaneously lowering and shifting rearward the seat pan as the seat back assembly moves from the reclined position to the upright position.

In at least one embodiment the pivot connection between the recline arm and the crank link is a free connection defining a first predetermined angle when the seat back assembly is the upright position, and defining a second predetermined angle when the seat back assembly is in the reclined position, wherein the second angle is less acute that the first angle.

In at least one embodiment, the forward beam tube includes a roller bearing positioned thereon against which the downwardly-facing surfaces of the seat pan rails ride.

In at least one embodiment, the forward beam tube includes a metal bearing surface and the downwardly-facing surfaces of the seat pan rails comprise low coefficient of friction plastic.

In at least one embodiment, the forward beam tube includes a plastic bearing surface and the downwardly-facing surfaces of the seat pan rails comprise metal.

In at least one embodiment, the seat pan rails include roller bearing assemblies for engaging and riding on the fore and aft beam tubes, and further wherein the reclining movement of the seat back assembly causes the roller bearing assemblies to move forwardly and to roll up over the beam tubes, raising and shifting the forward end of the seat bottom in the forward direction.

In at least one embodiment, the pivot link defines a substantially linear longitudinal axis.

In at least one embodiment, the pivot link defines a substantially curvilinear longitudinal axis.

In at least one embodiment, the seat pan rails include fore and aft roller bearing assemblies adapted to ride on an outer, upper surface of the fore and aft beam tubes, the fore and aft seat pan rail roller bearing assemblies pivotally-mounted on the seat pan rails for articulating movement in response to pivotal movement of the recline arm.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 11 is a perspective view of a passenger-supporting portion of a seat according to at least one embodiment of the invention.

DETAILED DESCRIPTION OF THE PREFERRED EMBODIMENTS AND BEST MODE

Figure 1:
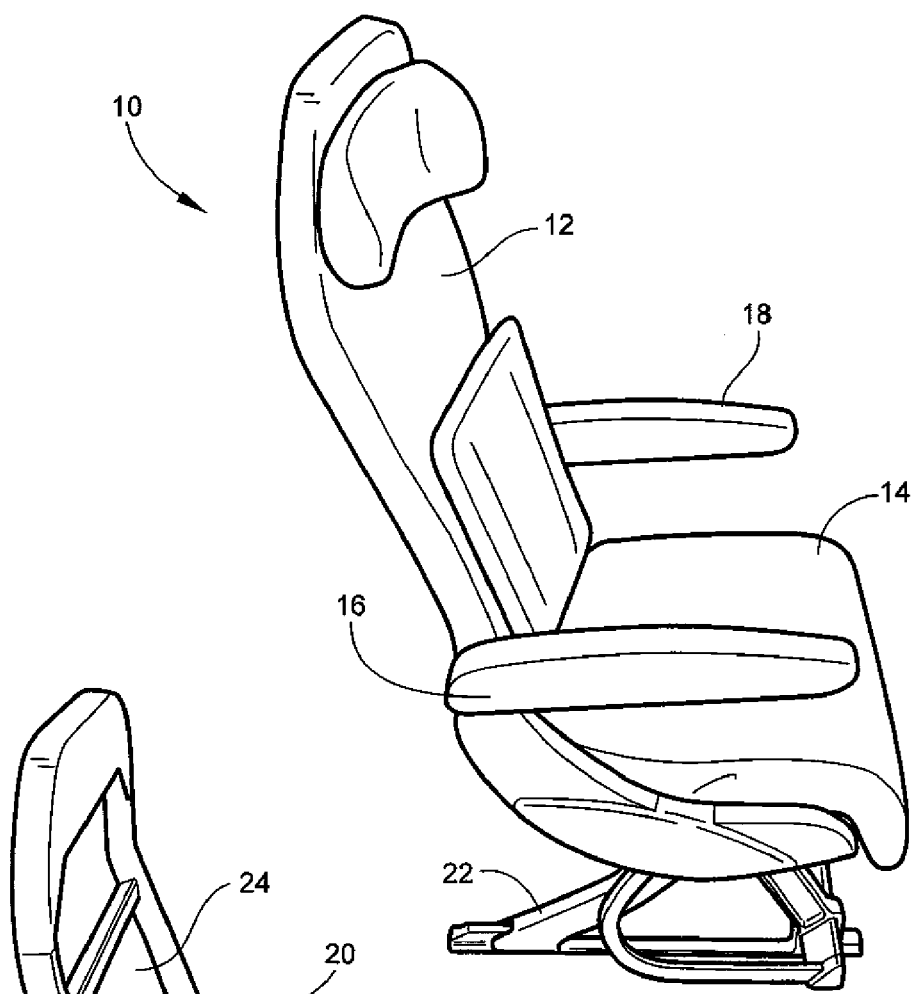
FIG. 1 is an generalized perspective view of a coach class passenger seat according to an embodiment of the invention.
Figure 2:
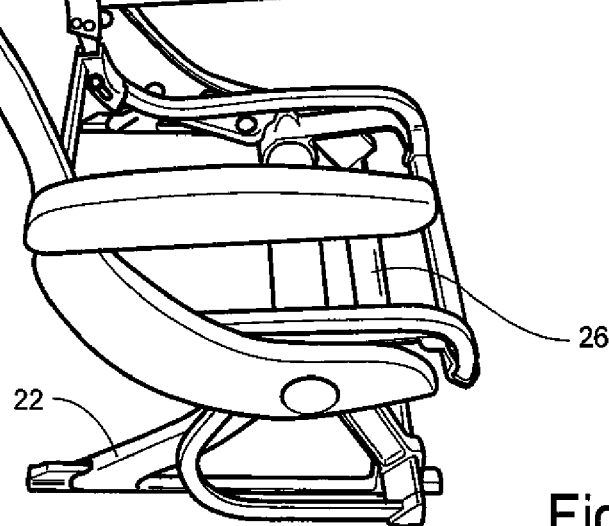
FIG. 2 is a view similar to FIG. 1, with parts removed for clarity.

Referring now specifically to the drawings, a passenger seat according to the present invention is shown generally in FIGS. 1 and 2 at reference numeral 10. The seat 10 includes a seat back 12, a seat bottom 14 and two arm rests 16, 18. The seat 10 is supported by a frame 20. The frame 20 is mounted on laterally spaced-apart legs 22 (one shown) which are in turn mounted to the deck of the aircraft by track fittings of a known type.

The frame 20 includes a seat back frame assembly 24 and a seat bottom assembly 26 that are joined for articulating movement in a manner described with reference to several embodiments. In certain of the drawings that follow, plural elements are described in the singular with reference to cross-sections where only one of the recited elements is visible. It will be understood that a like element is present on the other side of the seat but not visible due to the cross-sectional aspect of the drawings. In certain other drawings, perspective is used to further illustrate the invention.

Figure 3:
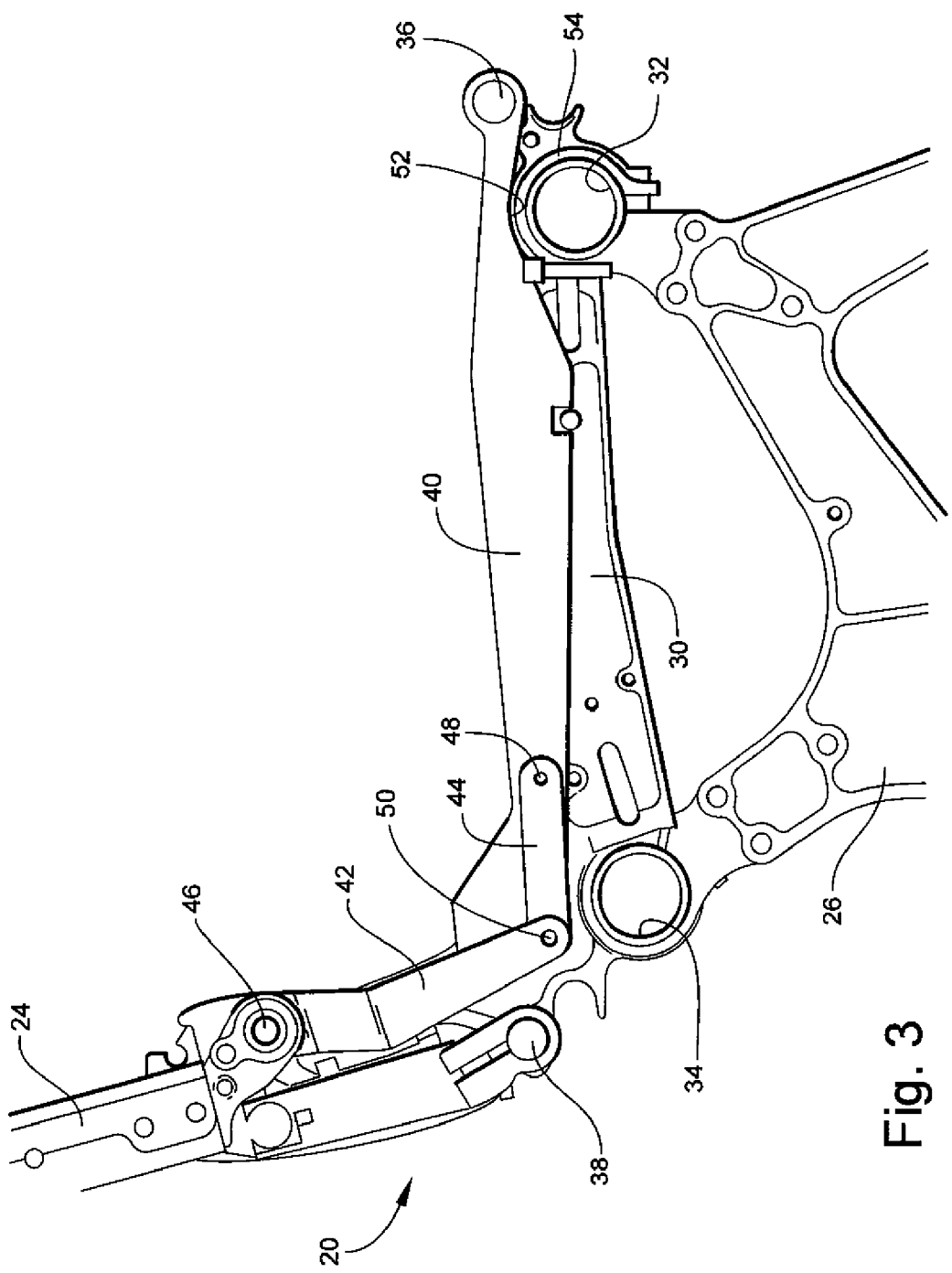
FIGS. 3 and 4 are fragmentary cross-sectional side elevations of a seat according to one embodiment of the invention.
Figure 4:
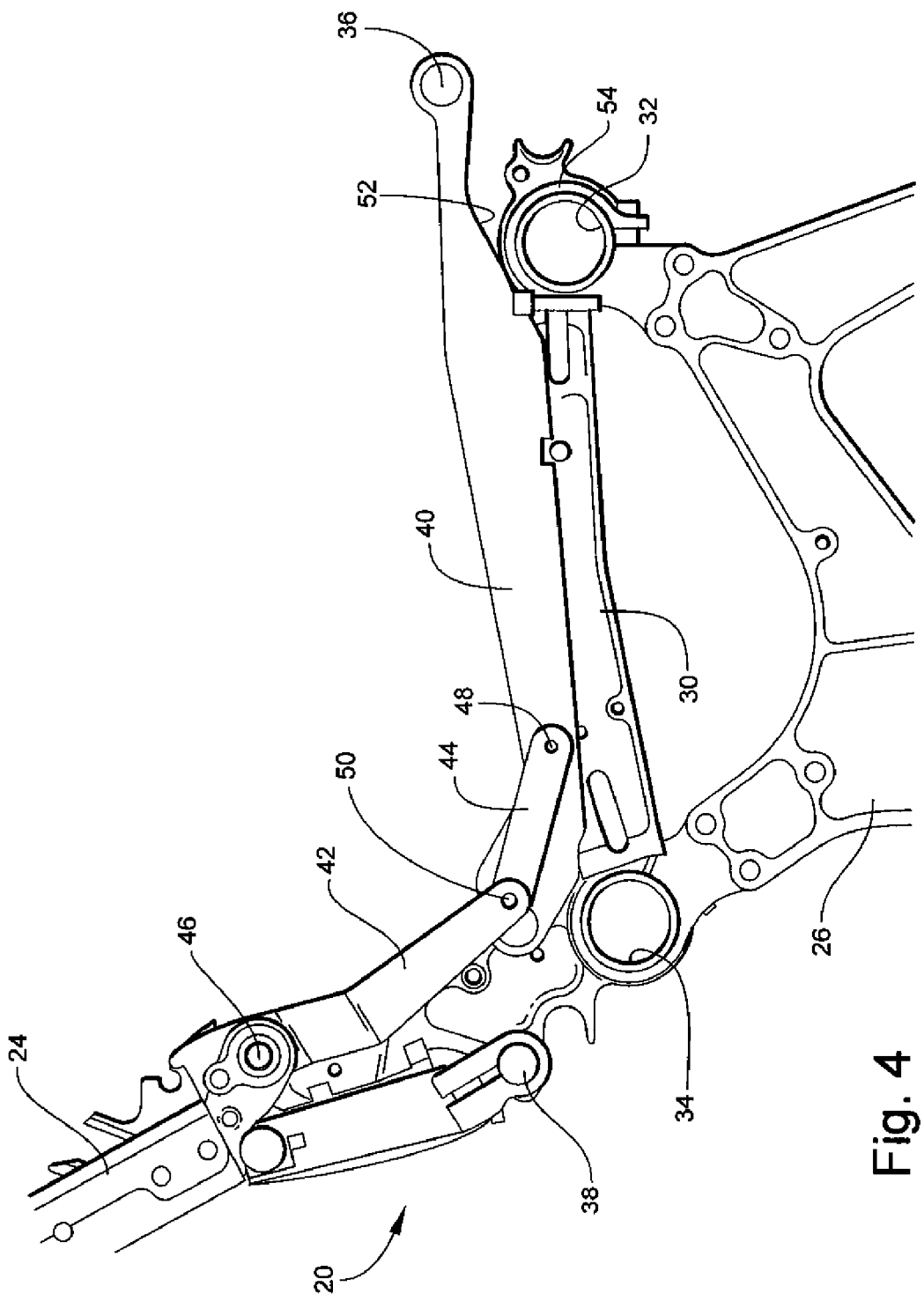

Referring now more specifically to the drawings, FIGS. 3 and 4 illustrate one embodiment of an articulating seat, and include in common with the other embodiments of FIGS. 5-10 the frame 20, which includes an integrally-formed spreader 30 carrying fore and aft, laterally-extending tubular seat beams 32, 34. Fore and aft diaphragm tubes 36, 38 support a seat pan in the form of a diaphragm 39 that is shown stretched tautly between diaphragm tubes 36, 38 in FIG. 11. The diaphragm 39 is illustrated as a synthetic fabric but these descriptions relate as well to other materials and constructions by which a seated passenger is supported by the diaphragm tubes 36, 38 and the seat pan rails 40. For example, a rigid or flexible seat pan may be positioned between the seat pan rails 40 for supporting a seated passenger. Thus, these descriptions refer to a seat pan while relating to many materials and constructions by which a seated passenger may be supported. A cushion or pad may be positioned between the passenger and the diaphragm or seat pan as represented in FIG. 1.

Each of the seat pan rails 40 include a pivoting linkage having a recline seat back arm 42 and a crank link 44 that is pinned freely between the seat pan and the recline arm 42. Recline arm 42 is mounted to the seat back frame assembly 22 at pivot point 46, and crank link 44 is mounted to the seat pan rail 40 at pivot point 48. A further pivot point 50 intermediate the two pivot points 46, 48 allows the two pivot links 42, 44 to articulate relative to each other, and transfers motion from the seat back 12 to the seat bottom 14.

The forward most bottom of the seat pan rail 40 defines a shaped surface 52 that rides on a roller bearing 54 that encircles the forward beam tube 32.

The seat pan rails 40 are articulated forward as a result of the rearward reclining motion of the seat back, through the motion of the link elements 42, 44. A conventional seat back release mechanism releases the seat back, and rearward pressure on the seat back 12 by the seated passenger reclines the seat back 12, and through the linked recline arm 42 and crank link 44, the seat pan rails 40 are pushed forwardly, causing the forward surface 52 of the seat pan rails 40 to ride up and over the top of the roller bearing 54, simultaneously raising and shifting forward the seat pan. This reclined condition can be seen by comparing FIG. 3 (upright) with FIG. 4 (reclined). The articulation is sufficient to maintain a comfortable seating angle that reduces the tendency of the passenger to slide forward on the seat bottom 14 when the seat back 12 is reclined. Similarly, the rearward most portion of the seat pan moves forward and downwardly, changing the angle of the seat pan and thus the seat bottom 14.

Figure 5:
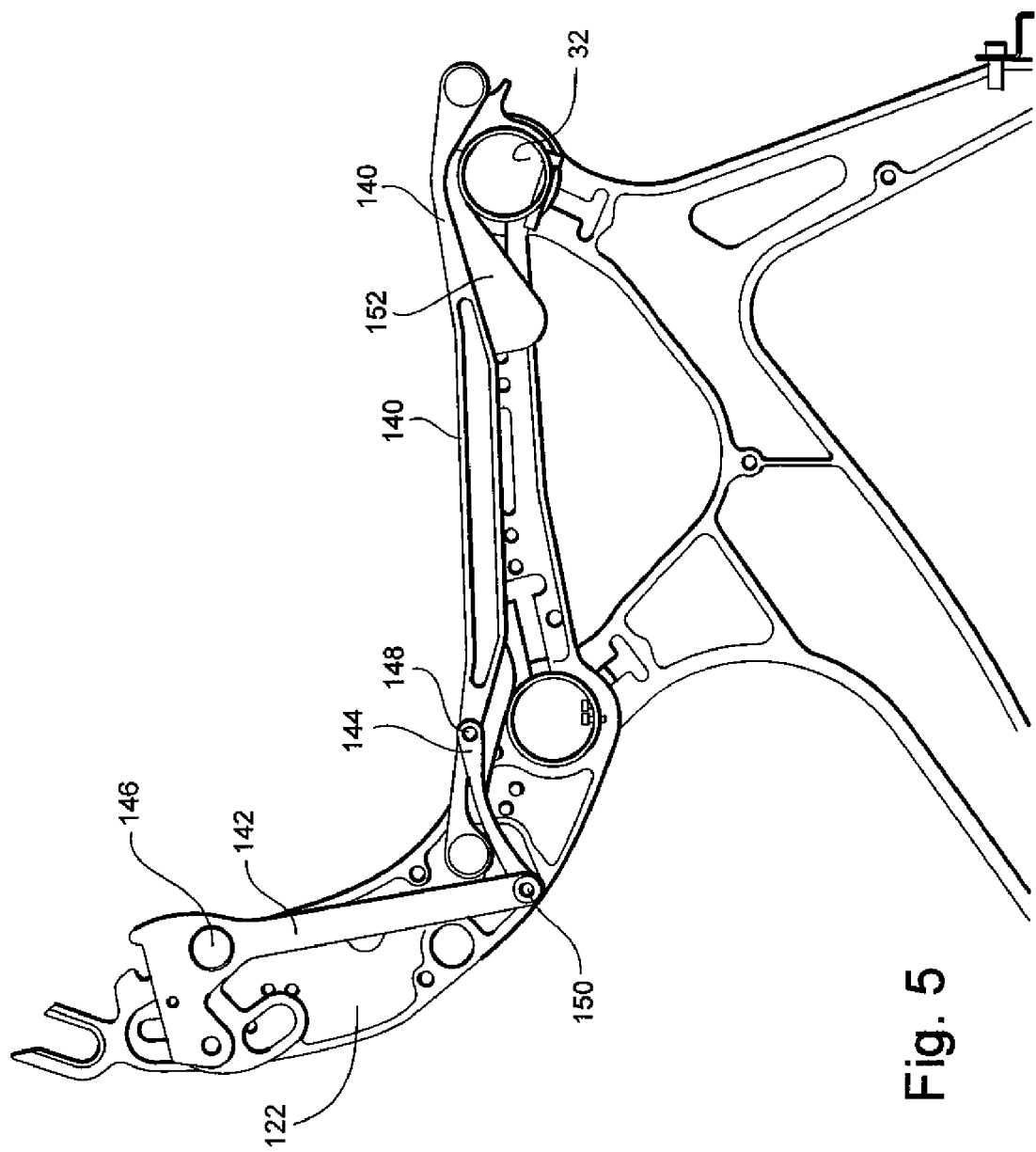
FIGS. 5 and 6 are fragmentary cross-sectional side elevations of a seat according to another embodiment of the invention.
Figure 6:
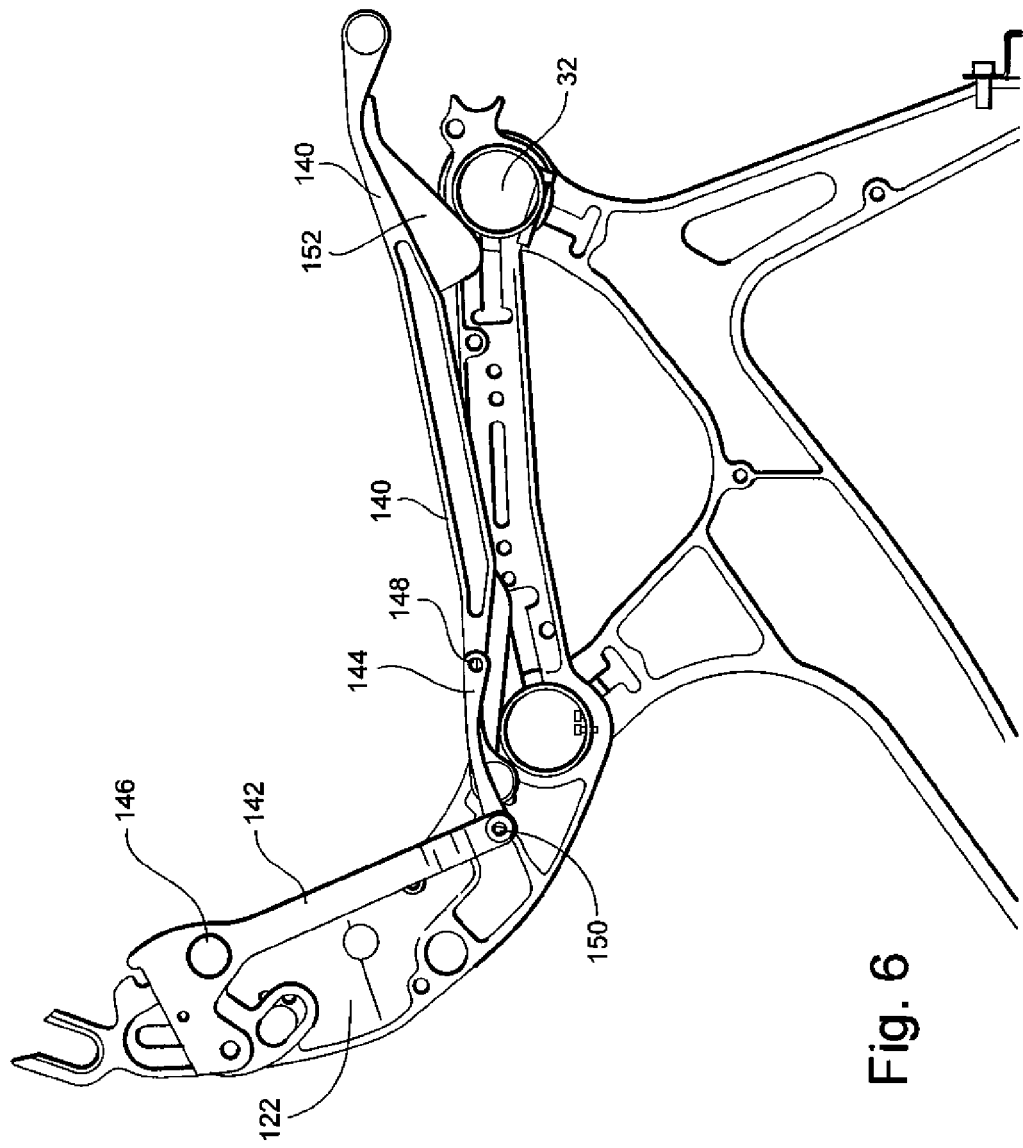

Referring now to FIGS. 5 and 6, each of the seat pan rails 140 include a pivoting linkage having a recline seat back arm 142 and a crank link 144 that is pinned freely between the seat pan rails 140 and the recline arms 142. Recline arm 142 is mounted to the seat back frame assembly 122 at pivot point 146, and crank link 144 is mounted to the seat pan rail 140 at pivot point 148. A further pivot point 150 intermediate the two pivot points 146, 148 allows the seat back arm 142 and the crank link 144 to articulate relative to each other, and transfers motion from the seat back 12 to the seat bottom 14.

The forward most bottom of the seat pan rail 140 defines a plastic wedge 152 that slides over the metal beam tube 32. Friction is reduced by the plastic on metal contact.

The seat pan rails 140 are articulated forward as a result of the rearward reclining motion of the seat back, through the motion of the link elements 142, 144. A conventional seat back release mechanism releases the seat back, and rearward pressure on the seat back 12 by the seated passenger reclines the seat back 12, and through the linked recline arm 142 and crank link 144, the seat pan rails 140 are pushed forward, causing the wedge 152 of the seat pans 140 rail to ride up and over the top of the beam tube 32.

Figure 7:
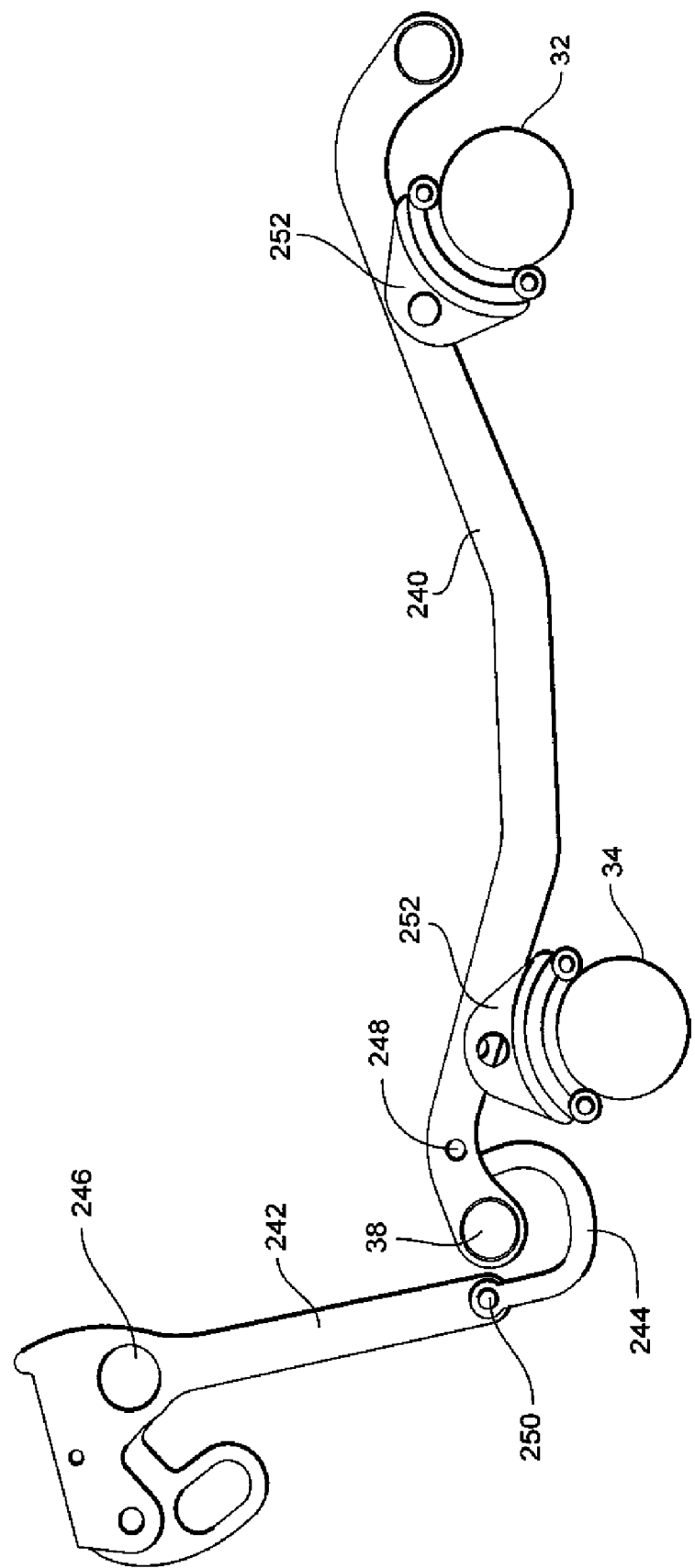
FIGS. 7 and 8 are fragmentary cross-sectional side elevations of a seat according to another embodiment of the invention.
Figure 8:
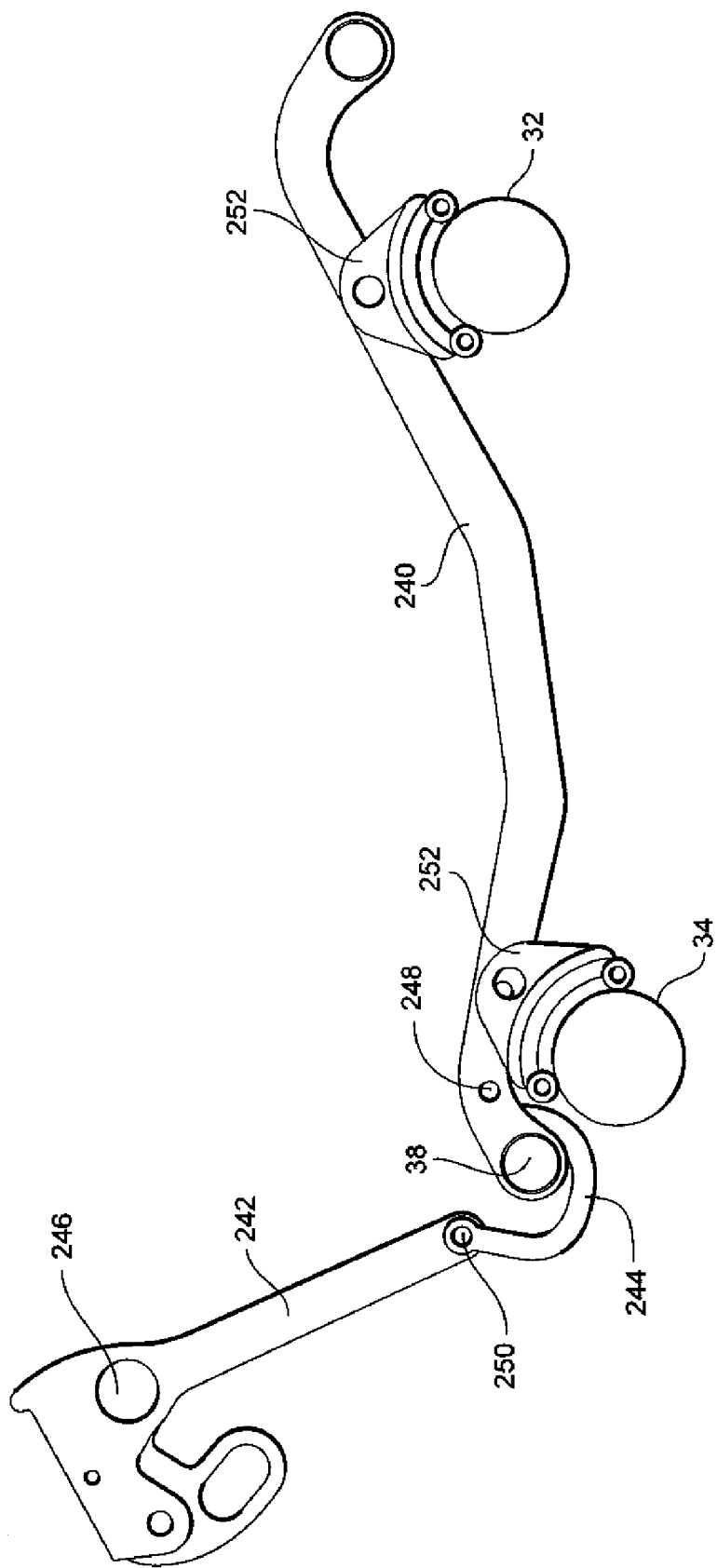

Another embodiment is shown in upright and reclined positions in FIGS. 7 and 8, respectively. The seat pan rail 240 includes a pivoting linkage having a recline seat back arm 242 and a U-shaped crank link 244 that passes under the diaphragm tube 38 and is pinned freely between the seat pan rail 240 and the recline arm 242. Recline arm 242 is mounted to the seat back frame assembly at pivot point 246, and crank link 244 is mounted to the seat pan rail 240 at pivot point 248. A further pivot point 250 intermediate the two pivot points 246, 248 allows the seat back arm 242 and the crank link 244 to articulate relative to each other, and transfers motion from the seat back 12 to the seat bottom 14.

Partial roller bearing assemblies 252 are pivotally mounted on the seat pan rails 240 and rest on the fore and aft beam tubes 32 and 34. Reclining movement of the seat back causes the roller bearing assemblies 252 to move forwardly and to roll up over the beam tubes 34 and 34, raising and shifting in the forward direction the forward end of the seat bottom.

Figure 9:
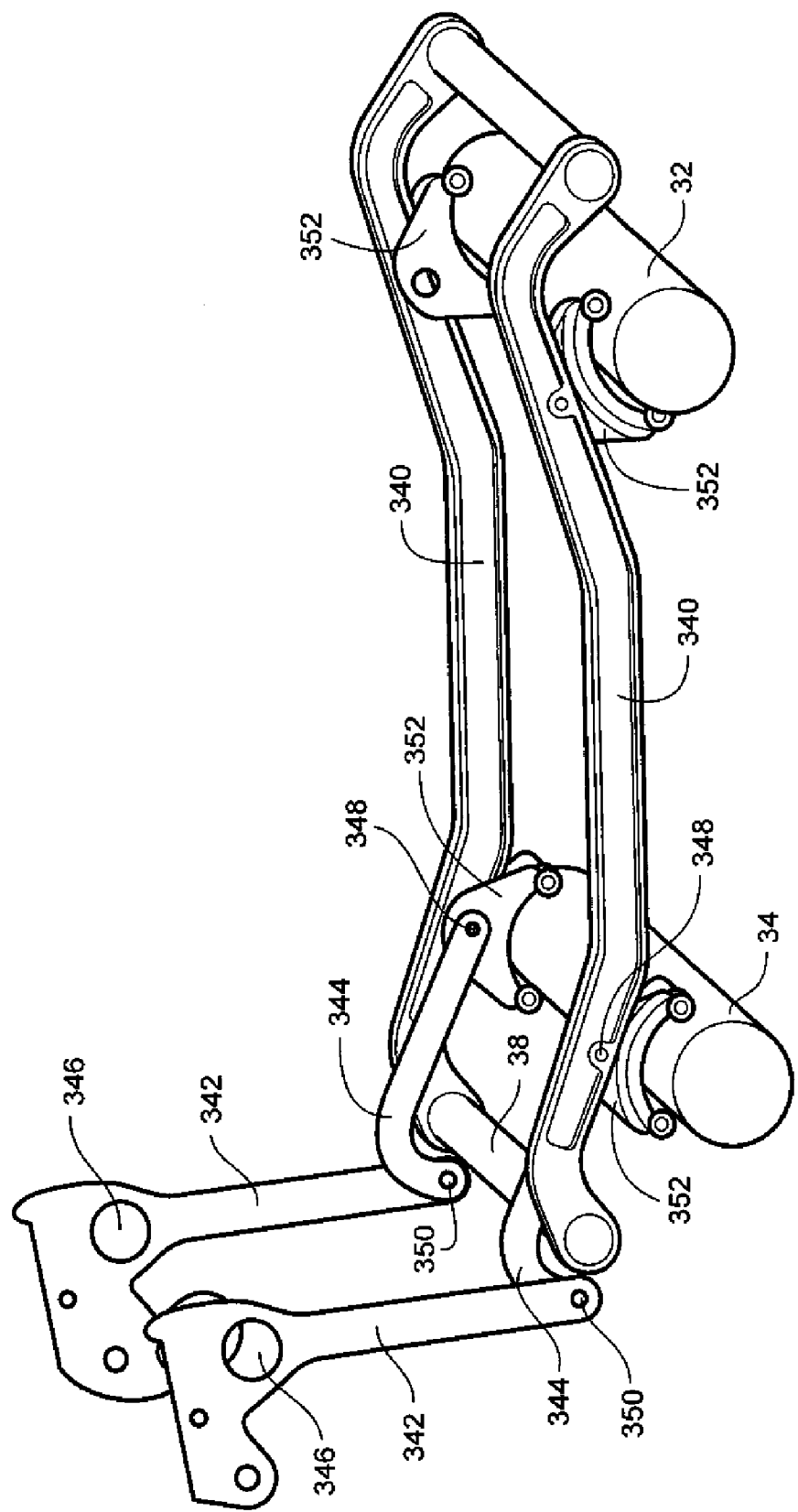
FIGS. 9 and 10 are fragmentary cross-sectional side elevations of a seat according to another embodiment of the invention.
Figure 10:
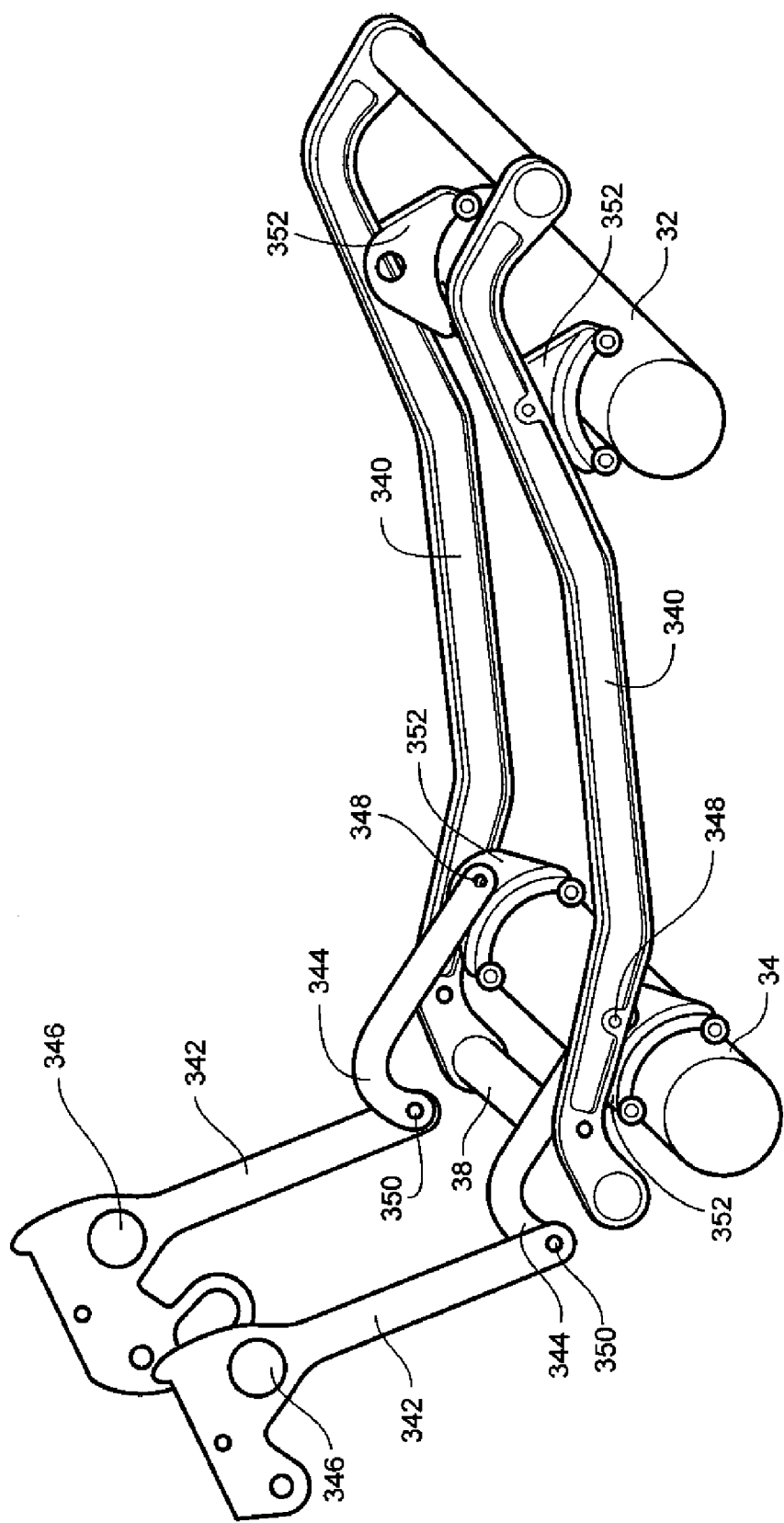

Another embodiment is shown in upright and reclined positions in FIGS. 9 and 10, respectively. The seat pan rails 340 include pivoting linkages having recline seat back arms 342 and J-shaped crank links 344 that pass over the diaphragm tubes 38 and are pinned freely between the seat pan rails 340 and the recline arms 342. Recline arms 342 are mounted to the seat back frame assembly at pivot point 346, and crank links 344 are mounted to the seat pan rails 340 at pivot points 348. Further pivot points 350 intermediate the two pivot points 346, 348 allow the seat back arm 342 and the crank link 344 to articulate relative to each other, and transfer motion from the seat back 12 to the seat bottom 14.

Partial roller bearing assemblies 352 are pivotally mounted on the seat pan rails 340 and rest on the fore and aft beam tubes 32 and 34. Reclining movement of the seat back causes the roller bearing assemblies 352 to move forwardly and to roll up over the beam tubes 34 and 24, raising and shifting in the forward direction the forward end of the seat bottom.

An improved articulated passenger seat according to several variants is described above. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A passenger seat having a simultaneous rearward movement of a seat back assembly with a compensating forward and upward movement of a forward end of a seat bottom assembly so that the passenger maintains a similar angle between the upper and lower body in both an upright and reclined seat back position, comprising:
    (a) a seat back assembly and a seat bottom assembly supported by a frame mounted on laterally spaced-apart legs for being mounted to a deck of an aircraft, the frame including laterally-extending forward and rear beam tubes;
    (b) first and second laterally-spaced seat pan rails carried by the seat bottom assembly for supporting a seat pan;
    (c) a pivot linkage, comprising:
        (i) a recline arm pivotally-connected proximate a first end to the seat back assembly and pivotally-connected proximate a second end to a first end of a crank link;
        (ii) the crank link pivotally connected at a second end remote from the recline arm to the seat pan for allowing the recline arm to drive the crank and transfer motion of the seat back between upright and reclined positions through the crank link to cause corresponding rearward and forward motions of the seat bottom assembly;
    (d) the seat pan rails defining respective downwardly-facing, shaped contact surfaces proximate a forward end thereof for riding on an upwardly-facing surface of the forward beam tube, the shaped contact surface adapted to lift the seat pan during forward movement of the seat pan, and lower the seat pan during rearward movement of the seat pan, thereby simultaneously raising and shifting forward the seat pan as the seat back assembly reclines and simultaneously lowering and shifting rearward the seat pan as the seat back assembly moves from the reclined position to the upright position; and
    (e) the seat pan rails having forward and rear roller bearing assemblies pivotally mounted thereon riding on an outer, upper surface of the forward and rear beam tubes for articulating movement in response to pivotal movement of the recline arm.

2. A passenger seat according to claim 1, wherein the pivot connection between the recline arm and the crank link is a free connection.

3. A passenger seat according to claim 1, wherein the forward beam tube includes a plastic bearing surface and the downwardly-facing surfaces of the seat pan rails comprise metal.

4. A passenger seat according to claim 1, wherein the forward beam tube includes a metal bearing surface and the downwardly-facing surfaces of the seat pan rails comprise low coefficient of friction plastic.

5. A passenger seat according to claim 1, and including fore and aft diaphragm tubes carried by the seat pan rails for supporting a fabric diaphragm.

6. A passenger seat having a simultaneous rearward movement of a seat back assembly with a compensating forward and upward movement of a forward end of a seat bottom assembly so that the passenger maintains a similar angle between the upper and lower body in both an upright and reclined seat back position, comprising:
    (a) a seat back assembly and a seat bottom assembly supported by a frame mounted on laterally spaced-apart legs for being mounted to a deck of an aircraft, the frame including laterally-extending forward and rear beam tubes;

(b) a seat occupant operable seat back recline assembly for permitting the seat occupant to selectively move the seat back assembly between upright and reclined positions;

(c) first and second laterally-spaced seat pan rails carried by the seat bottom assembly for supporting a seat pan and a seat bottom cushion supporting seat diaphragm;

(d) a pivot linkage, comprising:
  (i) a recline arm pivotally-connected proximate a first end to the seat back assembly and pivotally-connected proximate a second end to a first end of a crank link;
  (ii) the crank link pivotally connected at a second end remote from the recline arm to the seat pan for allowing the recline arm to drive the crank and transfer motion of the seat back between upright and reclined positions through the crank link to cause corresponding rearward and forward motions of the seat bottom assembly;

(e) the seat pan rails defining respective downwardly-facing, shaped contact surfaces proximate a forward end thereof for riding on an upwardly-facing surface of the forward beam tube, the shaped contact surface adapted to lift the seat pan during forward movement of the seat pan, and lower the seat pan during rearward movement of the seat pan, thereby simultaneously raising and shifting forward the seat pan as the seat back assembly reclines and simultaneously lowering and shifting rearward the seat pan as the seat back assembly moves from the reclined position to the upright position; and (f) the seat pan rails having forward and rear roller bearing assemblies pivotally mounted thereon riding on an outer, upper surface of the forward and rear beam tubes for articulating movement in response to pivotal movement of the recline arm.

7. A passenger seat according to claim 6, wherein the pivot connection between the recline arm and the crank link is a free connection defining a first predetermined angle when the seat back assembly is the upright position, and defining a second predetermined angle when the seat back assembly is in the reclined position, wherein the second angle is less acute that the first angle.

8. A passenger seat according to claim 6, wherein the forward beam tube includes a metal bearing surface and the downwardly-facing surfaces of the seat pan rails comprise low coefficient of friction plastic.

9. A passenger seat according to claim 6, wherein the forward beam tube includes a plastic bearing surface and the downwardly-facing surfaces of the seat pan rails comprise metal.

10. A passenger seat according to claim 6, wherein the pivot link defines a substantially linear longitudinal axis.

11. A passenger seat according to claim 6, wherein the pivot link defines a substantially curvilinear longitudinal axis.

* * * * *